US007072267B2

(12) United States Patent
Wood

(10) Patent No.: US 7,072,267 B2
(45) Date of Patent: Jul. 4, 2006

(54) IMAGE AND DATA STORAGE BY FOCUSED ION BEAM RECORDATION AND METHOD THEREOF

(76) Inventor: William Monford Wood, 1006 Paseo de la Cuma, Sante Fe, NM (US) 87501

( * ) Notice: Subject to any disclaimer, the term of this patent is extended or adjusted under 35 U.S.C. 154(b) by 690 days.

(21) Appl. No.: 10/302,208

(22) Filed: Nov. 22, 2002

(65) Prior Publication Data

US 2004/0022161 A1 Feb. 5, 2004

Related U.S. Application Data

(60) Provisional application No. 60/332,555, filed on Nov. 26, 2001.

(51) Int. Cl.
*G11B 7/00* (2006.01)

(52) U.S. Cl. ........................................ 369/101; 369/126

(58) Field of Classification Search .............. 369/275.3, 369/275.2, 275.1, 101, 126
See application file for complete search history.

(56) References Cited

U.S. PATENT DOCUMENTS 5,481,527 A * 1/1996 Kasanuki et al. ........... 369/126

\* cited by examiner

*Primary Examiner*—Nabil Hindi

(57) ABSTRACT

A focused ion beam (FIB) apparatus is used to record analog (i.e. continuous) and/or digital (i.e. discrete) images or data within a medium, which is then recoverable by exposing this storage medium to a light source and observing the light reflected, transmitted, and/or diffracted by the medium from a specified reception point relative to the source light and the medium surface. Changes in the optical properties of the medium surface can be achieved in a controllable and predictable way over spatial regions as small as the tightest focus of a FIB in one or several of the following ways (In the following list, "structure" is defined as a polished, solid surface to which has been added either none, one, or several optical thin films of materials which differ from the adjacent materials):
1) Changes in structure optical properties due to implantation into a substrate.
2) Changes in structure optical properties due to implantation into and milling of a substrate.
3) Changes in structure optical properties due to implantation into optical thin film on a substrate or optical thin film structure.
4) Changes in structure optical properties due to implantation into and milling of optical thin film on a substrate or optical thin film structure.
5) Changes in structure optical properties due to etching of implanted region on a substrate.
6) Changes in structure optical properties due to etching of implanted region in an optical thin film on a substrate or optical thin film structure.

Optical changes can be observed within individual regions, or collectively by the process of diffraction, depending upon the optical system employed to recover the stored information.

9 Claims, 17 Drawing Sheets

(7 of 17 Drawing Sheet(s) Filed in Color)

a)

b)

a)

b)

a)

c)

b)

a)

b)

a)

b)

a)

b)

IMAGE AND DATA STORAGE BY FOCUSED ION BEAM RECORDATION AND METHOD THEREOF

This application claims benefit of 60/332,555 filed Nov. 26, 2001.

BACKGROUND OF THE INVENTION

1. Field of the Invention

This invention pertains to the recordation of analog (or continuous) and digital (or discrete) information in a medium and, more particularly, to the recordation of images and/or data in the medium that are recoverable by the exposure of the medium to an illuminating light source.

2. Related Art

It is known in the art that a focused ion beam (FIB) apparatus can be used to alter selected regions on the surface of a medium, either by ion implantation into the medium, or by milling of the medium, and that the regions of implantation and/or milling can be controlled to within a spatial resolution in the nanometer ($10^{-9}$ meters) range[1]. Micromachining of materials can also be achieved by etch sensitization of the material, i.e. by using the fact that a region implanted with ions will etch at a different rate than the un-implanted region when exposed to strong acid or base solutions[2]. Furthermore, alteration of the medium by ion implantation has direct consequences to the optical properties (reflectivity, transmissivity, absorption,) of the materials[3]. In addition to material changes caused by implantation with ions, the optical properties of thin films has been well understood for many years[4]. Making use of the properties of optical thin films, it is possible to amplify small changes in optical properties of a material through the interference filtration properties of such optical thin films.

1. Watkins, R E J et.al., Focused Ion-Beam Milling, *Vacuum*, v. 36 961–967. 1986 Young, R J, Micromachining Using a Focused Ion Beam, *Vacuum*, v. 44 353–356. 1993
2. Choquette, K. D. et.al., Dry Lithography Using Focused Ion-Beam Implantation and Reactive Ion Etching of $SiO_2$, *Applied Physics Letters*, 62, 3294–3296, 1993. Matiullah, Durrani, S. A., Measurement of the Etching Characteristics of Proton, Fission Fragment, and Heavy-Ion Tracks in CR-39, *Nuclear Tracks and Radiation Measurements*, 15, 203–206, 1988. Hosono, K. et.al., Novel Technique for Phase-shifting-mask Repair Using Focused-ion-beam Etch-back Process, *Japanese Journal of Applied Physics part I*, v. 31, 4468–4473. 1992
3. Townsend, P. D. et.al., Optical Effects of Ion Implantation, Cambridge Univ. Press, Cambridge, 1994.
4. Heavens, O. S., Optical Properties of Thin Solid Films, Butterworth's Scientific Publications, London, 1955. (reprinted by Dover Publications, Inc. N.Y. 1991)

SUMMARY OF THE INVENTION

The present invention relates to the use of a focused ion beam, (FIB), apparatus to alter the optical properties of a storage medium for the purpose of recording analog (or continuous) and/or digital (or discrete) images or data, which then may be recovered by exposing the medium to a light source and observing the light reflected, transmitted and/or diffracted by the medium from a specified reception azimuth and elevation relative to the illuminated surface of the medium and the illumination source.

While the present invention is described herein with reference to "white light" (i.e., polychromatic visible light) and various "colors" of light thereof (i.e., light of particular wavelength bands in the visible region such as Red, Green, or Blue), it should be understood that such description is in the nature of particular examples of the invention, and that the phenomena and principles described and referred to herein with regard to visible light will apply equally to the practice of the invention in non-visible light bands, i.e., in the infrared, ultraviolet, x-ray, etc.

The "storage medium" referred to herein may be simply an optical surface, or it may be composed of a polished substrate upon which have been deposited one or many optical thin films. (For the purpose of this discussion, an optical thin film can be defined as a solid material of uniform thickness whose thickness is in the range from 1/1000 to 100 times the wavelength of the electromagnetic radiation to be used.) The medium used in the practice of the present invention is altered from an otherwise uniform optical state by one of the following four methods:

a) implantation of ions within specified surface regions;

b) implantation within and milling of specified surface regions;

c) implantation within and subsequent chemical etching of specified surface regions;

d) implantation within, milling of, and subsequent chemical etching of specified surface regions.

Furthermore, after application of any of the above methods, subsequent material coating and reapplication of any of the above methods is possible, ad infinitum.

Application of any of the above processes causes local, predictable and controllable alterations in the optical properties (the reflectivity, transmissivity, and absorption) of the medium. These changes can be observed separately within each specific region, or the cumulative effects of changes to a number of adjacent surface areas can be observed simultaneously by means of diffraction, depending upon the system used for illumination and read back of the recorded data.

One embodiment of a data storage and retrieval system of the present invention comprises:

(1) a suitably modified and uniquely programmed focused ion beam implanting and milling apparatus;

(2) a medium composed of a highly polished substrate with a uniform optical thin film deposited on the surface, into which have been milled or etched regions of various depth;

(3) a microscope with illumination and observation both in the direction perpendicular to the medium surface.

Such a system can produce extremely durable media which can be made to render color images with effective pixel linear dimension as small as the longest wavelength of interest. In the case of visible light, this corresponds to image sizes at least 100 times smaller than conventional color microfilm. For black and white images, such a system can create images at least 10 times smaller than conventional black and white microfilm. In addition, such a system would allow replication using conformal replicate materials such as collodion, in conjunction with a thin film deposition process.

Another embodiment of a data storage and retrieval system of the present invention comprises (for this example, the "z-direction" is defined as the direction perpendicular to the highly polished surface, and the x- and y-directions are defined within the plane of the surface):

(1) a suitably modified and uniquely programmed focused ion beam implanting and milling apparatus;

(2) a medium composed of a highly polished substance, onto which may be deposited one or several optical thin films, into the outer surface of which have been milled or etched regions with various periodic structures in both the x- and y-directions defined in the plane of the medium surface;

(3) a microscope which views perpendicular to the medium surface (in this case the "z-direction,") with multi-spectral (e.g. "white light") illumination sources from fixed angles with respect to the medium surface in both the x-z planes and the y-z planes.

Such a system can produce extremely durable media which can be made to render color images with effective pixel linear dimension on the order of 3.5 times the longest wavelength of interest. In the case of visible light, this corresponds to image sizes at least 20 times smaller than conventional color microfilm. For black and white images, such a system can create images at least 2 times smaller than conventional black and white microfilm. In addition, such a system allows replication using conformal replicate materials such as collodion, in conjunction with a thin film deposition process. Furthermore, because this embodiment employs a directional dependence between illumination source and observation direction on the image recovery, it is possible to create media with more than one image occupying the same area on the storage medium, thus increasing the effective storage density.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 15a) Diagram of optical thin film structure for use in diffraction storage.

FIG. 15b) Predicted reflected grey scale for structure in 15a.

FIG. 15c) Predicted transmitted grey scale for structure in 15a.

FIG. 16a) Photograph of color swatches using diffraction.

FIG. 16b) Atomic Force Micrograph of swatches from 16a.

DETAILED DESCRIPTION OF THE INVENTION AND PREFERRED EMBODIMENTS THEREOF

The present invention makes use of a focused ion beam (FIB) apparatus to alter a recording medium in a predictable and controllable way to record analog (or continuous) and/or digital (or discrete) images or data. At least four modes of FIB operation are useful in the present invention:

a) implantation of ions within specified surface regions;

b) implantation within and milling of specified surface regions;

c) implantation within and subsequent chemical etching of specified surface regions;

d) implantation within, milling of, and subsequent chemical etching of specified surface regions.

With the use of any of the four modes of operation, data is stored on the medium surface based on the predictable and controllable changes in the surface optical properties (reflectivity, transmissivity and absorption) of the medium; changes in optical properties within a single material can be broken down into the following nine general categories:

1) Changes in optical properties due to material amorphization.

2) Changes in optical properties due to material expansion.

3) Changes in optical properties due to material contraction.

4) Changes in optical properties due to formation of color centers within the material.

5) Changes in optical properties due to formation of micro-clusters within the material.

6) Changes in optical properties due to material ordering (crystallization.)

7) Changes in optical properties due to material doping.

8) Changes in optical properties due to material implantation.

9) Changes in optical properties due to material composition changes.

These changes occur within the implantation depth of the ions into the medium.

Figure 3:
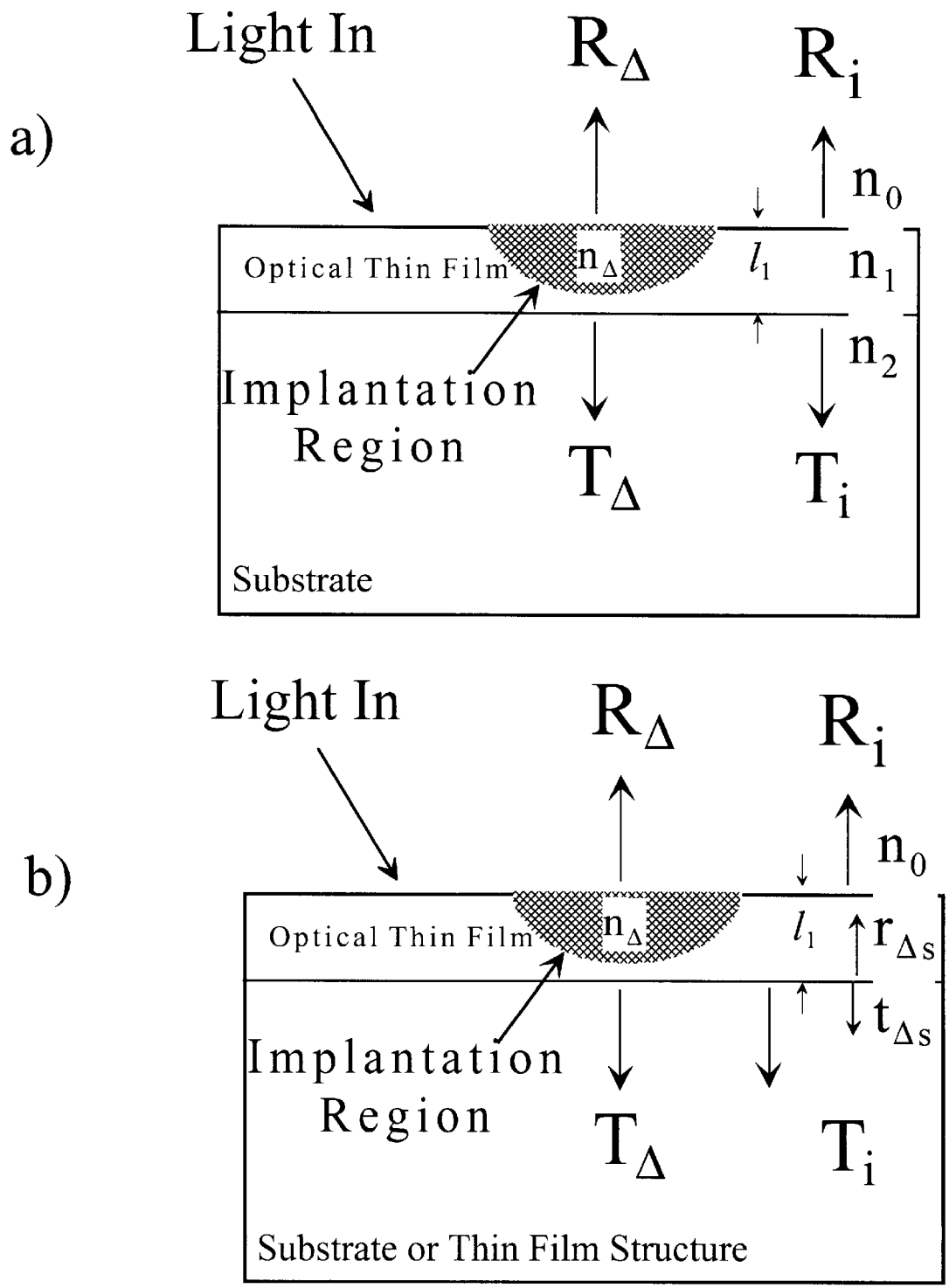
FIG. 3) Changes in structure optical properties due to implantation into optical thin film on a substrate or optical thin film structure.
Figure 4:
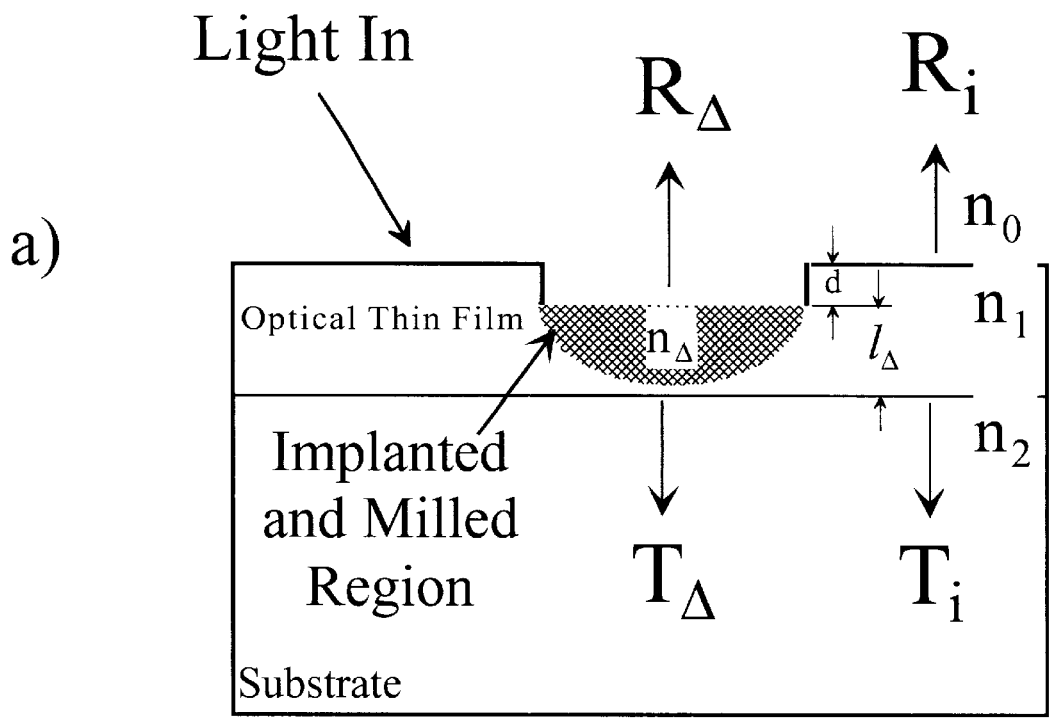
FIG. 4) Changes in structure optical properties due to implantation into and milling of optical thin film on a substrate or optical thin film structure.
Figure 4:
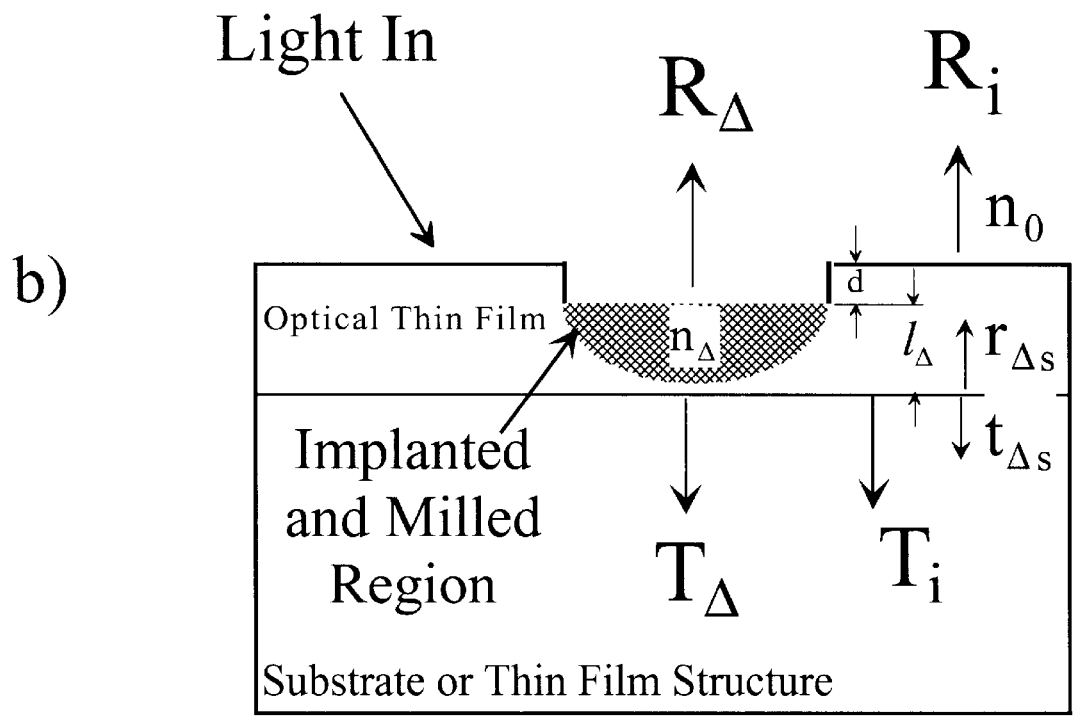

The actual realization of these optical changes can be enhanced by the use of optical thin film structures. Following is a list of the six basic ways in which reflectivity and transmissivity and absorption changes can be created in media structures:

1) Changes in structure optical properties due to implantation into a substrate. (FIG. 1)
2) Changes in structure optical properties due to implantation into and milling of a substrate. (FIG. 2)
3) Changes in structure optical properties due to implantation into optical thin film on a substrate or optical thin film structure. (FIG. 3)
4) Changes in structure optical properties due to implantation into and milling of optical thin film on a substrate or optical thin film structure. (FIG. 4)
5) Changes in structure optical properties due to etching of implanted region on a substrate. (FIG. 5)
6) Changes in structure optical properties due to etching of implanted region in an optical thin film on a substrate or optical thin film structure. (FIG. 6)

Heavens, O. S., Optical Properties of Thin Solid Films, Butterworth's Scientific Publications, London, 1955. (reprinted by Dover Publications, Inc. N.Y. 1991)

In general, descriptions of the changes in optical properties are described in terms of only the reflectivity and the transmissivity of a material or material structure, because these are the quantities which are observed directly. (The absorption plays a role in both of these quantities.) Furthermore, the optical changes described above entail changes in both the amplitude and the phase of the reflected and the transmitted light signals. These changes are described, generally, for the six media structures in the following equations. Although the diagrams, for simplicity, detail a material substrate with, at most, a single optical thin film, the inclusion of multiple thin films is easily achieved by replacing the relevant reflectivity of an interface with the reflectivity of the underlying thin film structure. Within the following equations, the subscripted variables $r_{ab}$ represents the amplitude and phase reflectivity (generally a complex number) at the interface between media "a" and "b," for light traveling from medium "a" into medium "b." Similarly, the variables $t_{ab}$ represent the amplitude and phase transmission for light encountering the interface going from "a" to "b." The energy or intensity reflectivities and transmissions can be found simply by multiplying these numbers by their complex conjugates. These reflectivity and transmissivity values are calculated in terms of the, generally complex, indices of refraction of the media, "n." The index of refraction in medium "a," for example, is written as "$n_a$." The reflectivity and the transmissivity of the unaltered structures are listed below as $R_i$ and $T_i$, respectively. The reflectivity and transmissivity for the altered structures are then listed as $R_\Delta$ and $T_\Delta$, respectively. Finally, the subscript $\Delta$ on the right hand side of the equations (e.g. $n_\Delta$,) represents the properties within the region that has been altered by the focused ion beam.

(The following definitions apply to the equations)

$$r_{ab} \equiv \frac{n_a - n_b}{n_a + n_b} \quad t_{ab} \equiv \frac{2n_a}{n_a + n_b} \quad \delta_a \equiv i\frac{2\pi n_a l_a}{\lambda_o}$$

Figure 1:
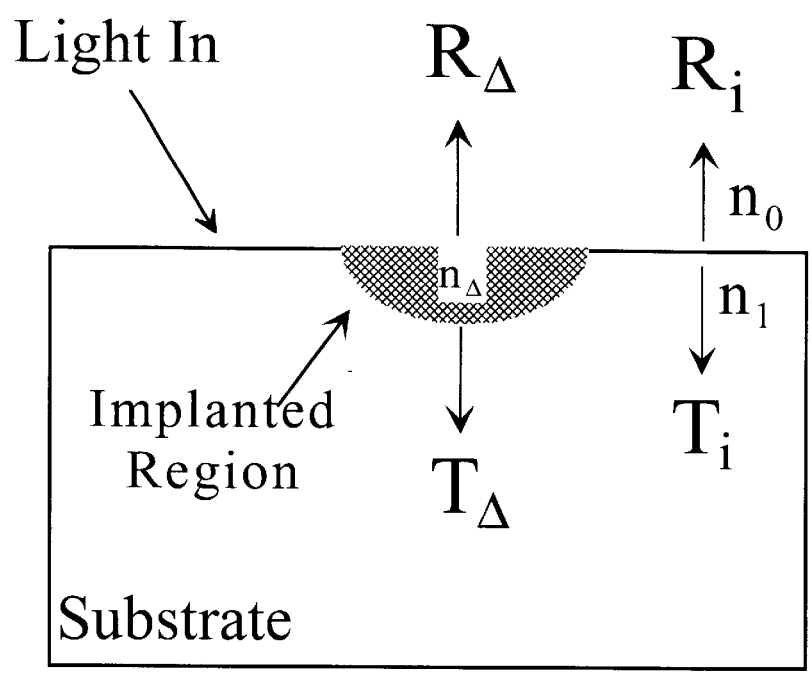
FIG. 1) Changes in structure optical properties due to implantation into a substrate.
Figure 2:
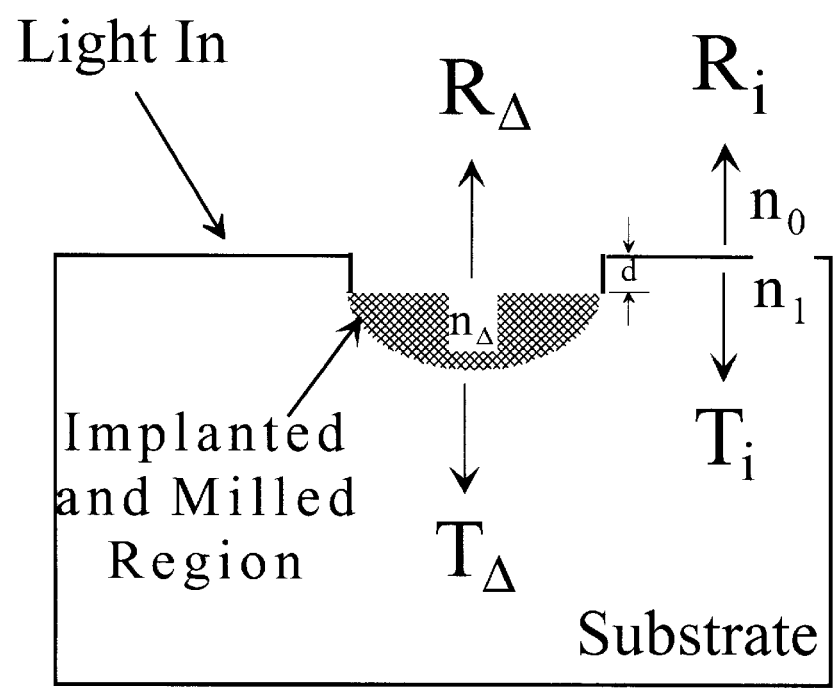
FIG. 2) Changes in structure optical properties due to implantation into and milling of a substrate.
Figure 5:
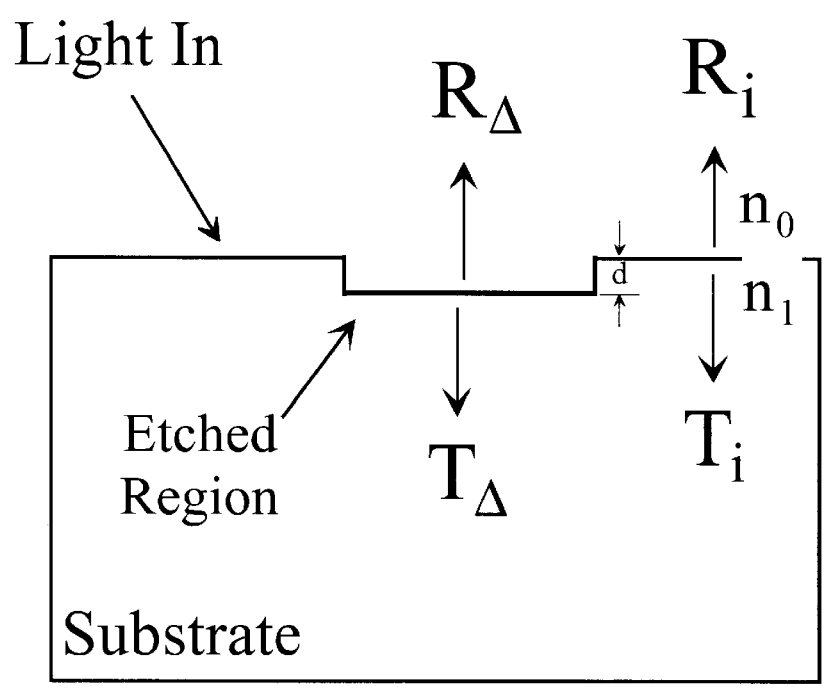
FIG. 5) Changes in structure optical properties due to etching of implanted region on a substrate.
Figure 6:
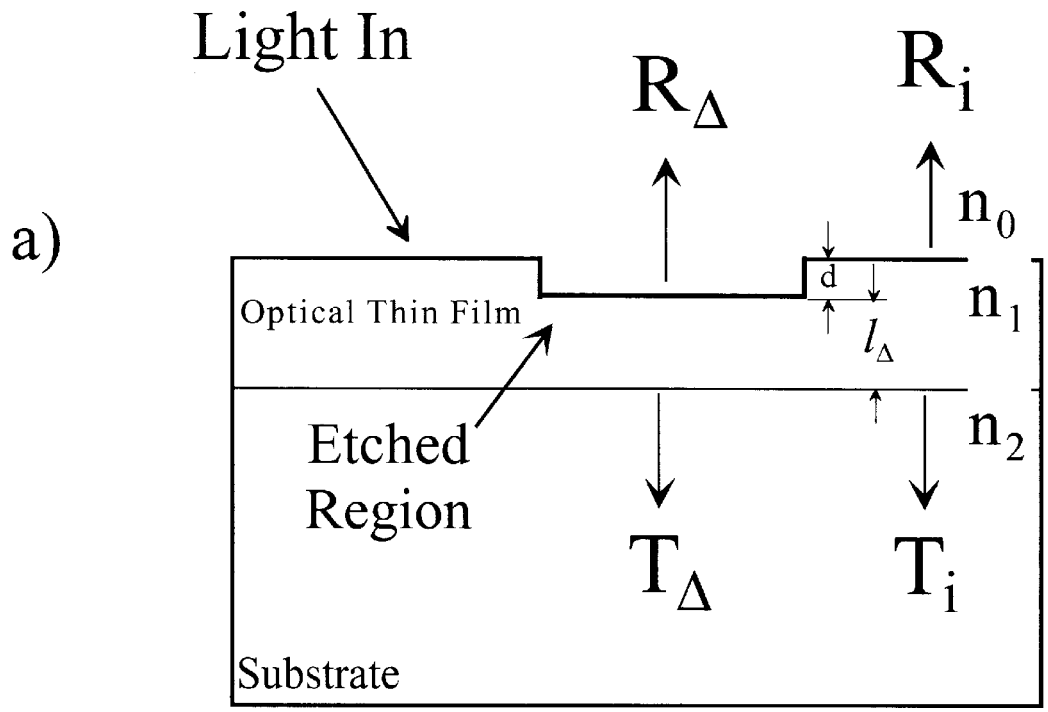
FIG. 6) Changes in structure optical properties due to etching of implanted region in an optical thin film on a substrate or optical thin film structure.
Figure 6:
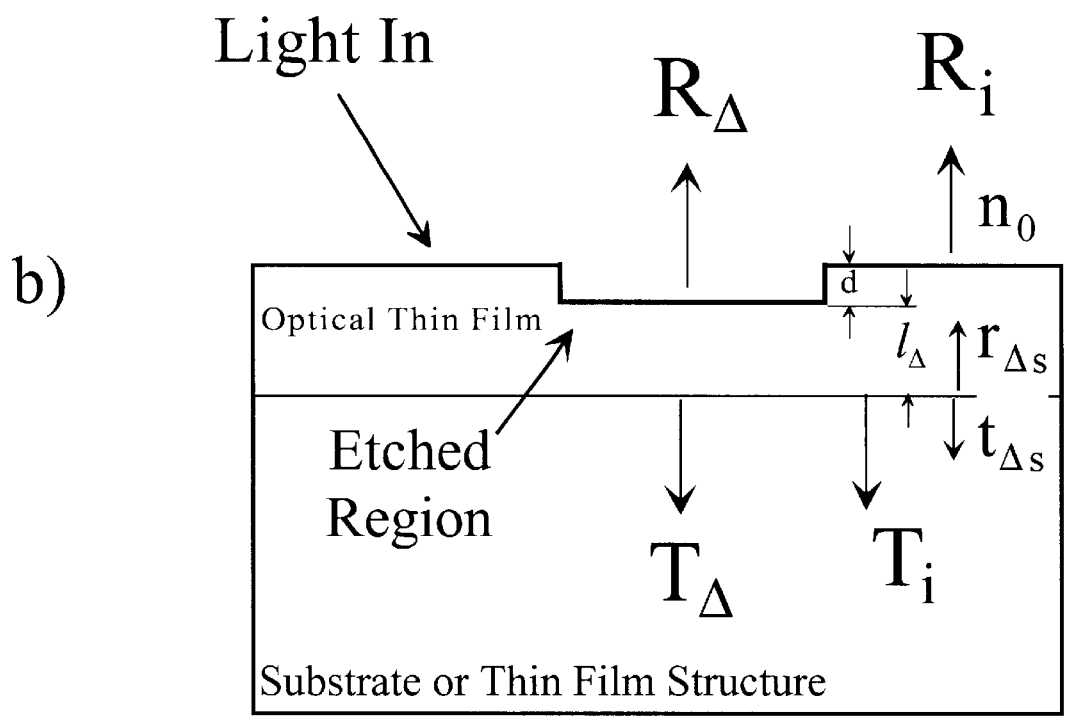

Fig. 1) $R_i = r_{01}\left(\equiv \frac{n_0 - n_1}{n_0 + n_1}\right) \quad T_i = t_{01}\left(\equiv \frac{2n_0}{n_0 + n_1}\right)$ $R_\Delta = r_{0\Delta}\left(\equiv \frac{n_0 - n_\Delta}{n_0 + n_\Delta}\right) \quad T_\Delta = t_{0\Delta}\left(\equiv \frac{2n_0}{n_0 + n_\Delta}\right)$ Fig. 2) $R_i = r_{01} \quad T_i = t_{01}$ $R_\Delta = r_{0\Delta} e^{i2\pi\frac{2d}{\lambda_o}} \quad T_\Delta = t_{0\Delta} e^{i2\pi\frac{d}{\lambda_o}}$ Fig. 3a) $R_i = \frac{r_{01} + r_{12}e^{2\delta_1}}{r_{01}r_{12}e^{2\delta_1} + 1} \quad T_i = \frac{t_{01}t_{12}e^{\delta_1}}{1 - r_{10}r_{12}e^{2\delta_1}}$ $R_\Delta = \frac{r_{0\Delta} + r_{\Delta 2}e^{2\delta_1}}{r_{0\Delta}r_{\Delta 2}e^{2\delta_1} + 1} \quad T_\Delta = \frac{t_{0\Delta}t_{\Delta 2}e^{\delta_1}}{1 - r_{\Delta 0}r_{\Delta 2}e^{2\delta_1}}$ Fig. 3b) $R_i = \frac{r_{01} + r_{1s}e^{2\delta_1}}{r_{01}r_{1s}e^{2\delta_1} + 1} \quad T_i = \frac{t_{01}t_{1s}e^{\delta_1}}{1 - r_{10}r_{1s}e^{2\delta_1}}$ $R_\Delta = \frac{r_{0\Delta} + r_{\Delta s}e^{2\delta_1}}{r_{0\Delta}r_{\Delta s}e^{2\delta_1} + 1} \quad T_\Delta = \frac{t_{0\Delta}t_{\Delta s}e^{\delta_1}}{1 - r_{\Delta 0}r_{\Delta s}e^{2\delta_1}}$ Fig. 4a) $R_i = \frac{r_{01} + r_{12}e^{2\delta_1}}{r_{01}r_{12}e^{2\delta_1} + 1} \quad T_i = \frac{t_{01}t_{12}e^{\delta_1}}{1 - r_{10}r_{12}e^{2\delta_1}}$ $R_\Delta = \frac{r_{0\Delta} + r_{\Delta 2}e^{2\delta_\Delta}}{r_{0\Delta}r_{\Delta 2}e^{2\delta_\Delta} + 1}e^{i2\pi\frac{2d}{\lambda_o}} \quad T_\Delta = \frac{t_{0\Delta}t_{\Delta 2}e^{\delta_\Delta}}{1 - r_{\Delta 0}r_{\Delta 2}e^{2\delta_\Delta}}e^{i2\pi\frac{d}{\lambda_o}}$ Fig. 4b) $R_i = \frac{r_{01} + r_{1s}e^{2\delta_1}}{r_{01}r_{1s}e^{2\delta_1} + 1} \quad T_i = \frac{t_{01}t_{1s}e^{\delta_1}}{1 - r_{10}r_{1s}e^{2\delta_1}}$ $R_\Delta = \frac{r_{0\Delta} + r_{\Delta s}e^{2\delta_\Delta}}{r_{0\Delta}r_{\Delta s}e^{2\delta_\Delta} + 1}e^{i2\pi\frac{2d}{\lambda_o}} \quad T_\Delta = \frac{t_{0\Delta}t_{\Delta s}e^{\delta_\Delta}}{1 - r_{\Delta 0}r_{\Delta s}e^{2\delta_\Delta}}e^{i2\pi\frac{d}{\lambda_o}}$ Fig. 5) $R_i = r_{01} \quad T_i = t_{01}$ $R_\Delta = r_{01}e^{i2\pi\frac{2d}{\lambda_o}} \quad T_\Delta = t_{01}e^{i2\pi\frac{d}{\lambda_o}}$ Fig. 6a) $R_i = \frac{r_{01} + r_{12}e^{2\delta_1}}{r_{01}r_{12}e^{2\delta_1} + 1} \quad T_i = \frac{t_{01}t_{12}e^{\delta_1}}{1 - r_{10}r_{12}e^{2\delta_1}}$ $R_\Delta = \frac{r_{0\Delta} + r_{\Delta 2}e^{2\delta_\Delta}}{r_{0\Delta}r_{\Delta 2}e^{2\delta_\Delta} + 1}e^{i2\pi\frac{2d}{\lambda_o}} \quad T_\Delta = \frac{t_{0\Delta}t_{\Delta 2}e^{\delta_\Delta}}{1 - r_{\Delta 0}r_{\Delta 2}e^{2\delta_\Delta}}e^{i2\pi\frac{d}{\lambda_o}}$ Fig. 6b) $R_i = \frac{r_{01} + r_{1s}e^{2\delta_1}}{r_{01}r_{1s}e^{2\delta_1} + 1} \quad T_i = \frac{t_{01}t_{1s}e^{\delta_1}}{1 - r_{10}r_{1s}e^{2\delta_1}}$ $R_\Delta = \frac{r_{01} + r_{1s}e^{2\delta_\Delta}}{r_{01}r_{1s}e^{2\delta_\Delta} + 1}e^{i2\pi\frac{2d}{\lambda_o}} \quad T_\Delta = \frac{t_{01}t_{1s}e^{\delta_\Delta}}{1 - r_{10}r_{1s}e^{2\delta_\Delta}}e^{i2\pi\frac{d}{\lambda_o}}$ Using any of the six methods described above, the optical changes can be used to create individual regions of color (or black or white,) with resolution of these regions limited only by the longest wavelength of light which will be used to read back the stored information and retain the color information. Because the changes in optical properties are controllable and predictable, the reflection and transmission properties can easily be calculated for any given illumination source. In the case of visible light, the useful minimal size of a region, or "resolution," can be as small as 0.7 microns for standard white light microscopy. For shorter wavelength light, this minimal sized region decreases proportional to the maximum wavelength of light to be used.

Using any of the six methods described above, optical changes within the storage structures can also be used to create diffractive regions. Because the changes in optical properties are controllable and predictable, the diffraction properties can easily be calculated for any given illumination source. Resolution limits for this type of storage are defined by diffraction efficiencies and desired color separation, and typically are on the order of 3.5 times the longest wavelength desired for read back. In the case of visible light, this is approximately 2.5 microns for color information storage.

ANALOG STORAGE

EXAMPLE METHOD I

Interference Color Pixels (Transmission and/or Reflection)

Using an optical thin film (ranging in thickness between 1/1000 and 100 times the wavelength of light to be used,) coated on a polished, base substrate or optical thin film structure, it is possible to change the optical depth selectively of the surface layer by implantation and milling with the FIB. Because optical thin film structures act as interference filters, the local changes to the surface layer (including the change in thickness) serve to change the wavelength tuning of the interference filter structure, resulting in color change on reflection or transmission of white light incident on the region.

Figure 9:
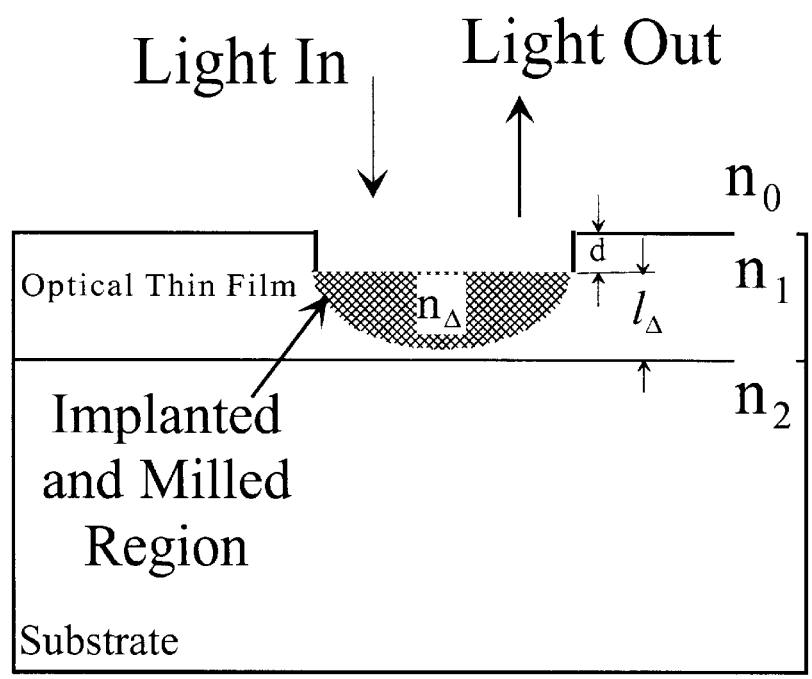
FIG. 9) Example of Interference Color Pixels embodiment for information storage.

One embodiment of an analog color storage system based upon the interference wavelength filtration properties of optical thin film structures is as follows (see FIG. 9): Defining the direction perpendicular to the surface of the storage medium as the "Z" direction, and also as the observation direction, it is possible selectively to modify the properties of the surface optical thin film so that the color properties of light reflected perpendicular to the surface, or transmitted through the medium, also in a direction perpendicular to the surface, are changed in a controllable and predictable way within spatial regions down to approximately 5 nanometers on a side. The smallest region that can be effectively observed, however, is restricted by the longest wavelength of light used for read back of the analog image. For visible light, this is approximately 0.6 microns. Using the FIB, regions of transverse dimension 0.6 microns on a side can be written with a full range of colors, including black and white. Intensity variations can be recorded by appropriate combinations of adjacent pixel colors. Using a four-pixel intensity scheme, effective pixel sizes for analog image storage of 1.2 microns on a side can be achieved.

Figure 11:
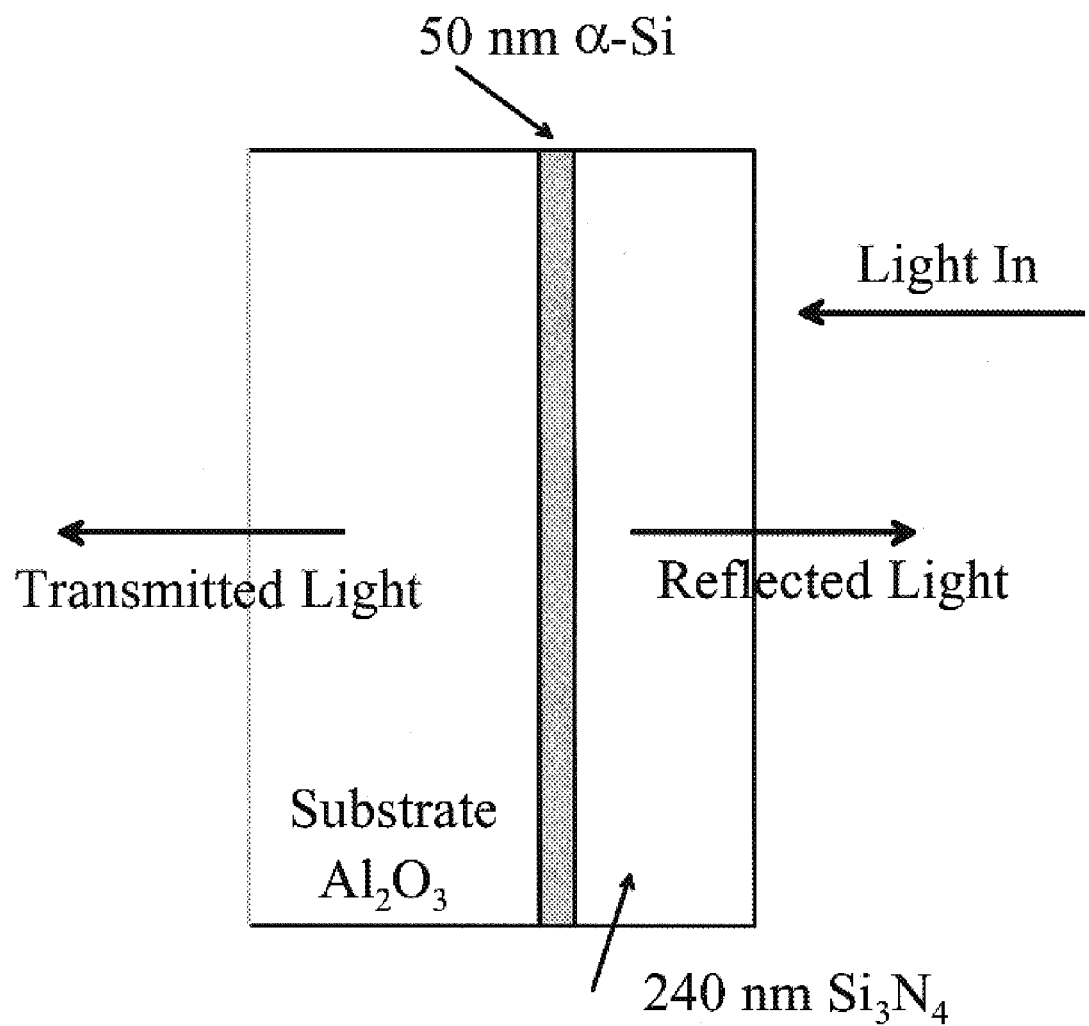
FIG. 11) Optical thin film structure for use with reflective or transmissive interference color.
Figure 12:
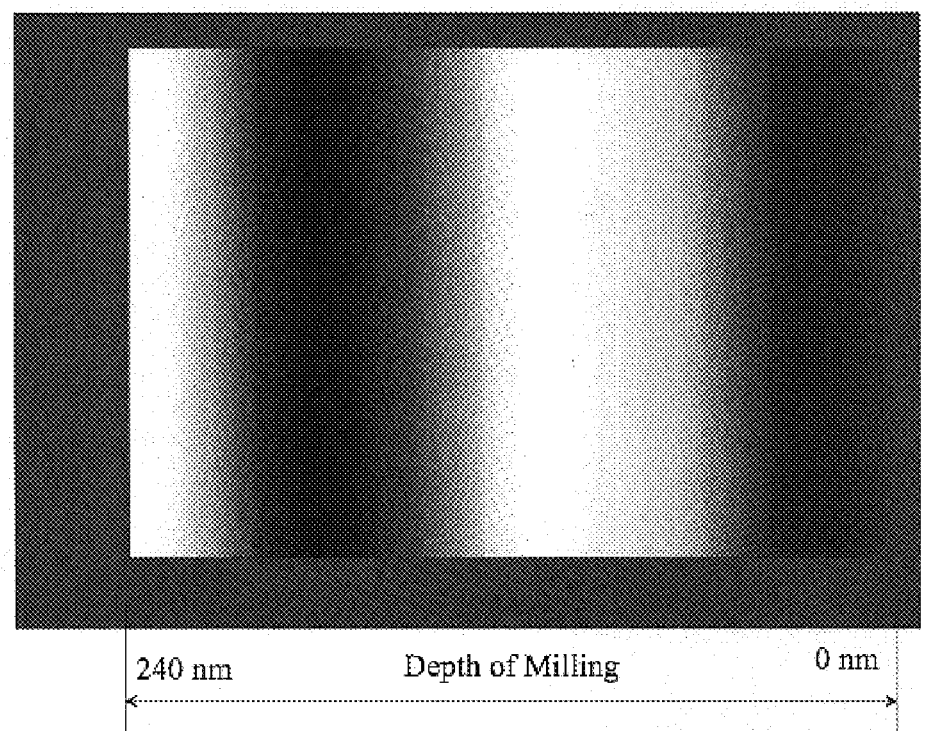
FIG. 12a) Predicted color on reflection from structure in FIG. 11.
FIG. 12b) Predicted color on transmission through structure in FIG. 11.
Figure 12:
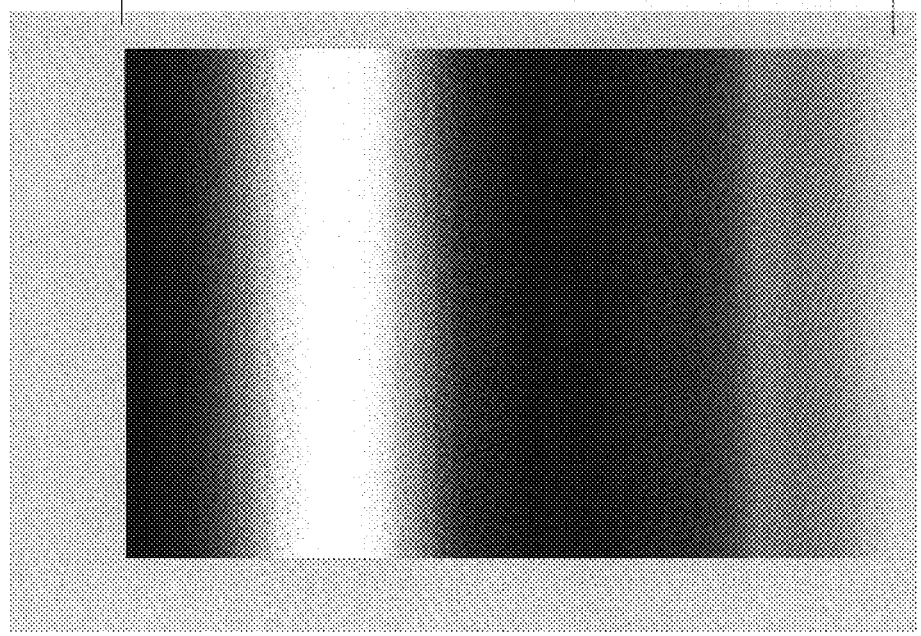
Figure 13:
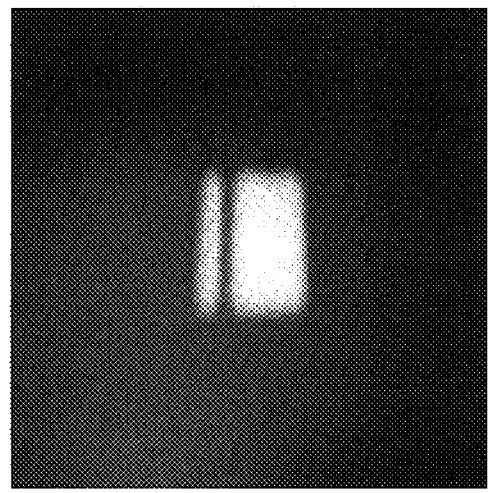
FIG. 13a) Color wedge milled into sample of structure like FIG. 11, viewed in reflection.
FIG. 13b) Atomic Force Micrograph of wedge from 13a)
Figure 13:
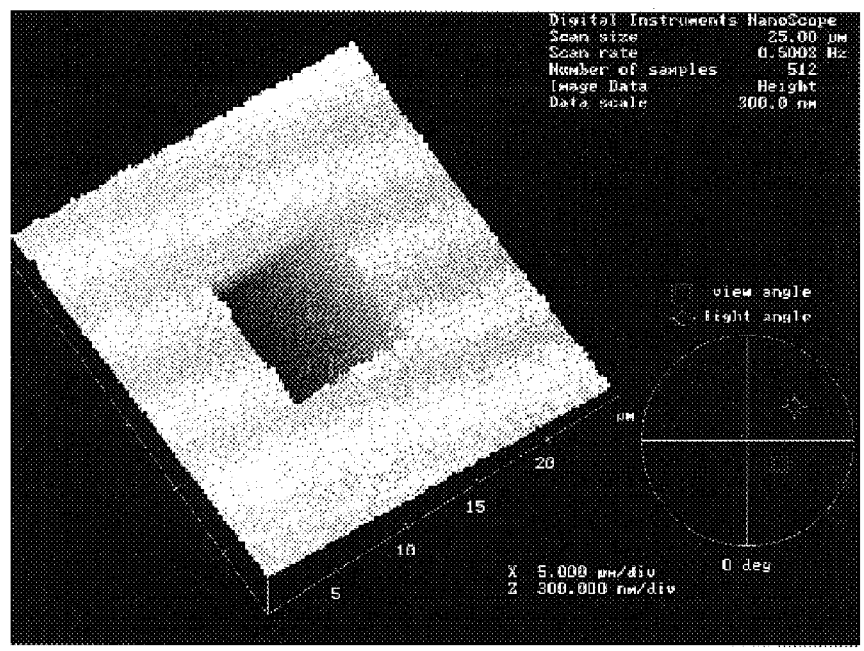

A specific embodiment of this method is illustrated in FIG. 11: a substrate of sapphire, $Al_2O_3$, has been coated with an optical thin film of 50 nanometer thickness α-Silicon, and then 240 nanometers of silicon nitride, $Si_3N_4$. FIG. 12 shows the predicted color range under white light illumination for both transmission and reflection perpendicular to the surface for the medium described. Note the color range includes a grey scale that goes from white to black. FIG. 13*a* shows a photograph of a wedge measuring 10 microns on a side, taken through a microscope with light reflected back from the surface. FIG. 13*b* shows an Atomic Force Micrograph (AFM) of the same structure.

Figure 14:
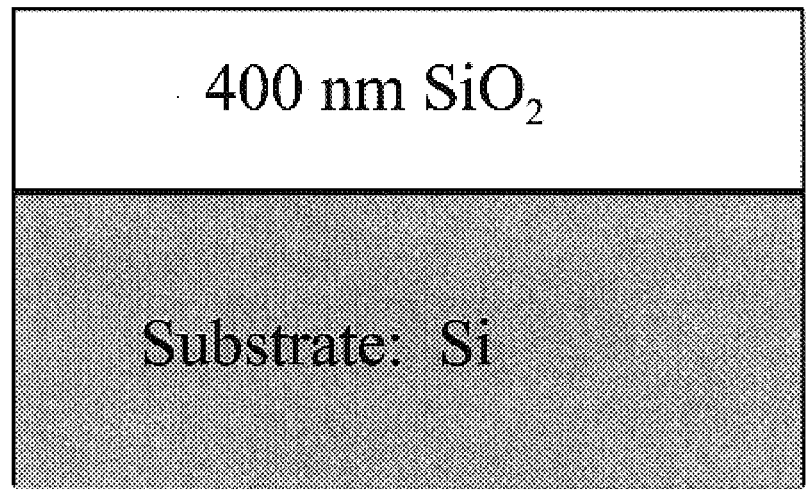
FIG. 14a) Diagram of structure with 400 nanometers $SiO_2$, coated onto a silicon wafer FIG. 14b) Color wedge milled into sample of structure like FIG. 14a, viewed in reflection.
Figure 14:
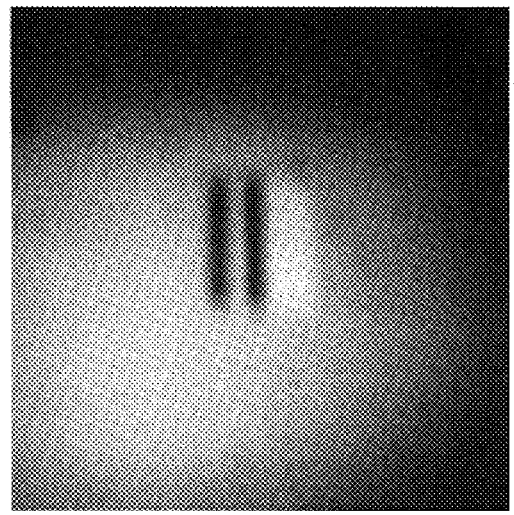

FIG. 14*a* shows a diagram for a silicon wafer substrate coated with 400 nanometers silicon oxide, $SiO_2$. FIG. 14*b* shows a photograph taken through a microscope with reflected white light, demonstrating the color range for a wedge cut into the structure from 14*a*.

When used to store black and white, or grey scale, images, the reflective or transmissive properties of the surface can be monitored at a single wavelength. Using visible light, the shortest wavelength is about 0.4 microns, leading to effective pixel sizes of 0.16 square microns. Using a UV source of 0.2 microns, the pixel size for a grey scale image is further reduced to 0.04 square microns.

EXAMPLE METHOD II

Reflective or Transmissive Diffractive Color Pixels

Figure 7:
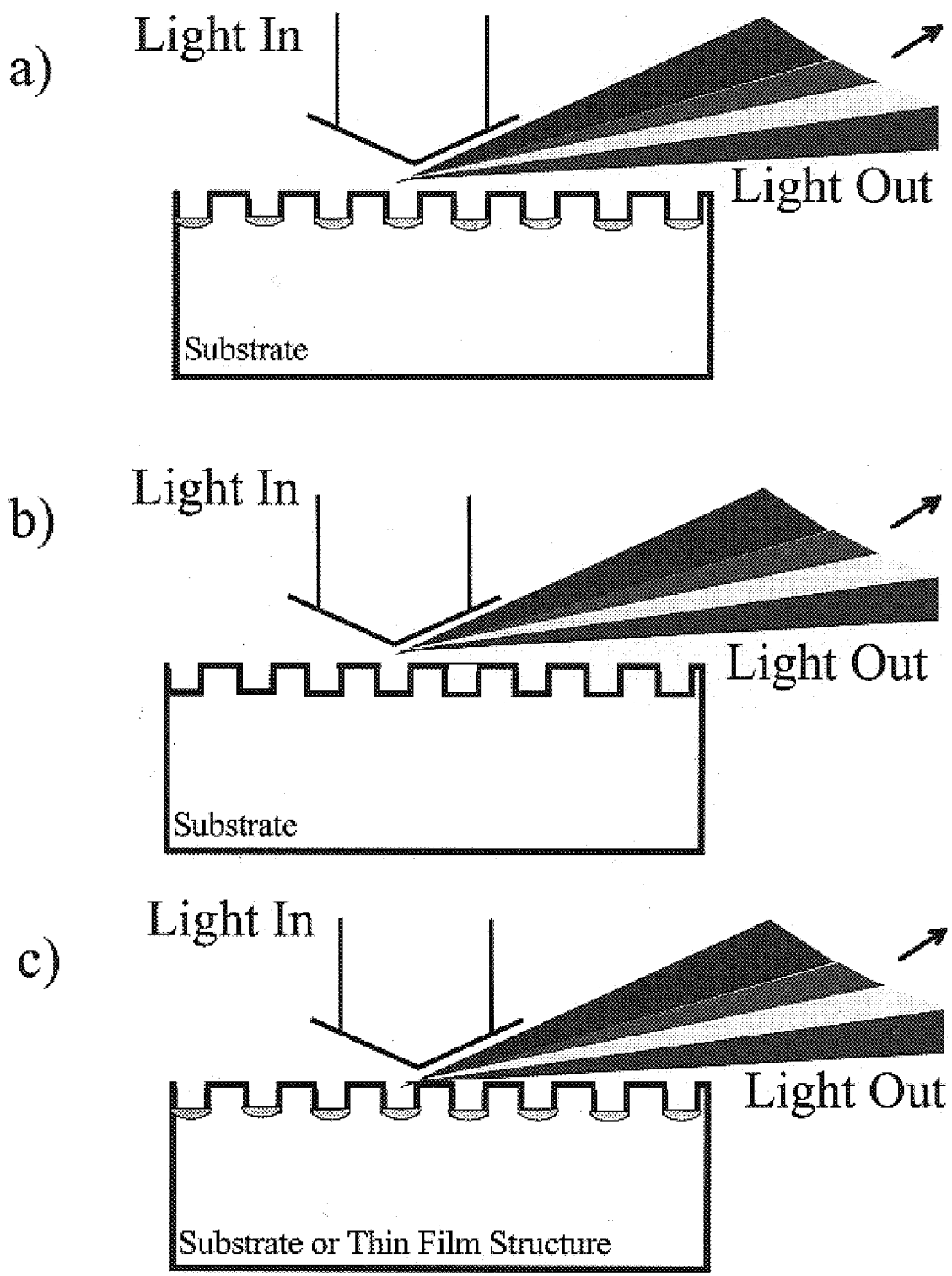
FIG. 7a) Example of diffractive structure created from milling and implantation into a substrate, indicating diffraction.
FIG. 7b) Example of diffractive structure created from implantation and etching of a substrate, indicating diffraction.
FIG. 7c) Example of diffractive structure created from milling and implantation into an optical thin film on a substrate or optical thin film structure, indicating diffraction.

Using one of the six methods for changing the reflectivity and transmission of a material or material structure as described above, it is possible to create surfaces with diffractive structures. Any time there exist features in reflectivity or transmission (either amplitude or phase) with spatial extent on the order of the size of the wavelength of the illuminating light, either larger or smaller, diffraction becomes important. Using the FIB, it is possible to create surface patterns with features smaller than the wavelength of visible light. The simplest such structure is a periodic spatial variation, of which FIG. 7) shows three examples. By changing the reflective and transmission properties of a material surface in a predictable and controllable way, it is possible to calculate the diffractive behaviour of the surface, even when the surface features are significantly more complex than simple periodic structures.

Figure 8:
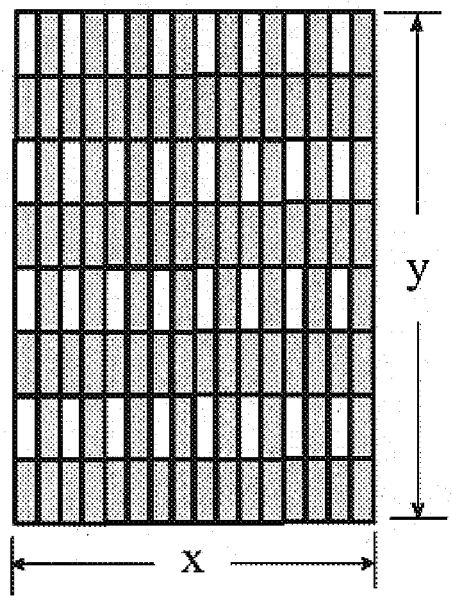
FIG. 8a) Example of a surface with diffractive pattern "pixel" for simultaneous diffraction in the X-Z plane and Y-Z plane.
FIG. 8b) Pixel viewed in X-Z plane.
FIG. 8c) Pixel viewed in Y-Z plane.
Figure 8:
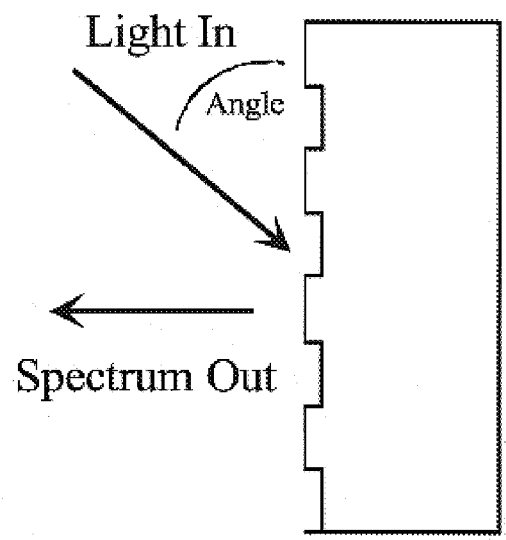
Figure 8:
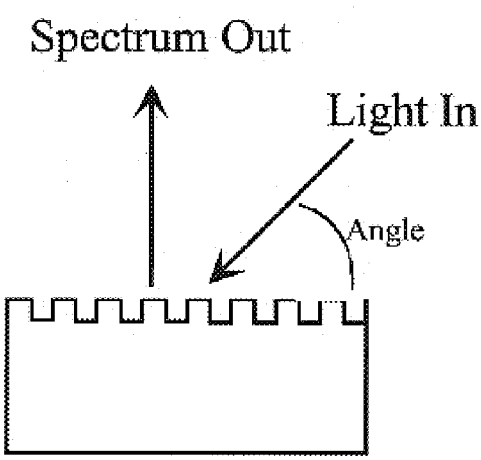

One embodiment of an analog color storage system based on the diffractive properties of a controlled medium or structure is as follows (see FIG. 8): Defining the direction perpendicular to the surface of the storage medium as the "Z" direction, and also as the observation direction, it is possible to create periodic changes (using one of the six methods outlined above) along the X-direction with one period, and periodic changes along the Y-direction with a different period. This "checkerboard" structure can now be illuminated from a fixed set of angles in the X-Z plane (e.g. 40 degrees from perpendicular in either direction) to diffract one spectrum of light due to the periodic structure along the X-direction, and from a fixed set of angles in the Y-Z plane (e.g. 40 degrees from perpendicular in either direction) to diffract another spectrum of light due to the periodic structure along the Y-direction. In this way, a full range of colors, including black and white, can be created in a small region. Furthermore, intensity at each color can also be controlled by adjusting the contrast depth of the periodic variations (whether this is the peak to peak variation of the phase of the reflected light as a function of position, or the amplitude, or both.)

Figure 15:
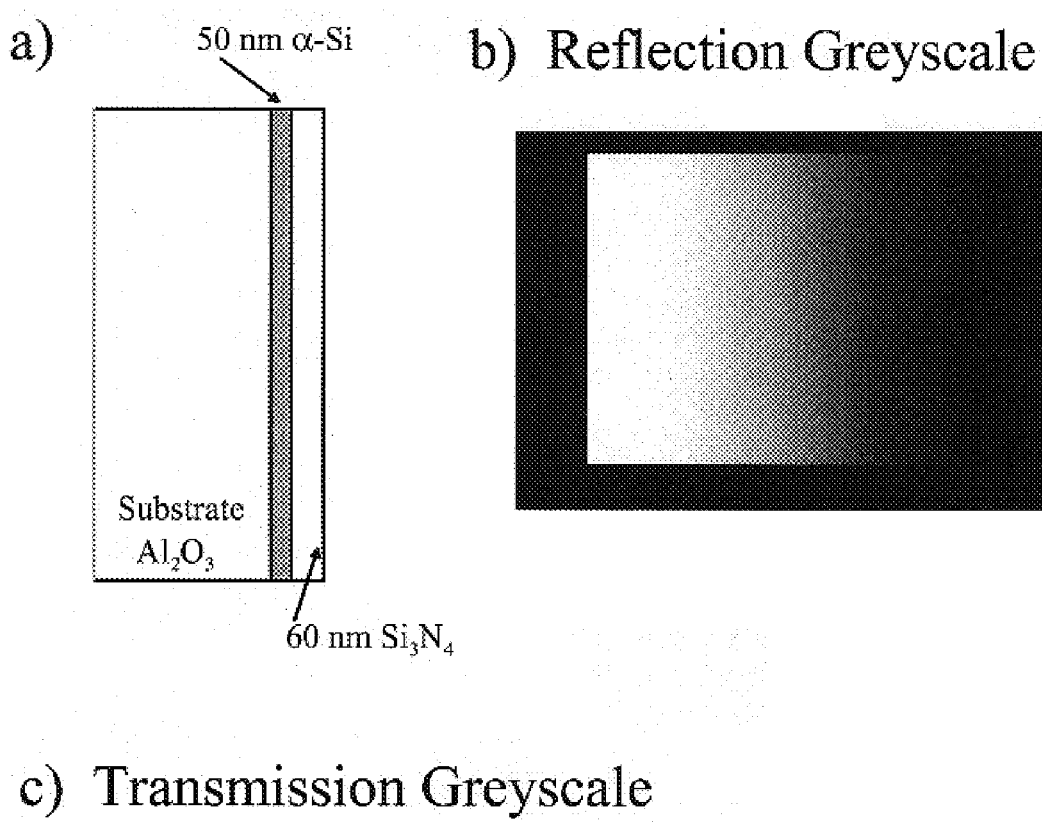

A specific embodiment of this idea is similar to that showed in FIG. 11: a substrate of sapphire, $Al_2O_3$, has been coated with an optical thin film of 50 nanometer thickness α-Silicon, and then 65 nanometers of silicon nitride, $Si_3N_4$. FIG. 15*a* diagrams this structure, and FIGS. 15*b* and 15*c* show the predicted grey scale found when the silicon nitride layer is milled away. Use of this grey scale, in conjunction with periodic structures milled or etched into the surface, can create a "reflective" diffractive structure (point of observation on the same side of the structure plane as the illumination,) or "transmissive" diffractive structure (point of observation on the opposite side of the structure plane as the illumination.)

To achieve a comparable storage of black and white data, only one wavelength of light is needed, and the grey scale is achieved by varying the intensity of light which is reflected. Using visible light, the shortest wavelength would be 0.4 microns. Available UV sources would allow 0.2 microns wavelength.

Pixel sizes of approximately 2.5 microns on a side, or about 6 microns squared, can be achieved with reasonable diffraction efficiencies for use with visible light. Recovery of the image in real color is achieved using a microscope or other, similar, optical viewing apparatus. For black and white storage, visible light could be used monochromatically at 0.4 microns, allowing pixel sizes of 1.2 microns on a side, or 1.5 square microns. For UV illumination, these numbers can be further reduced to a pixel size of 0.7 microns on a side, or 0.5 square microns.

Figure 16:
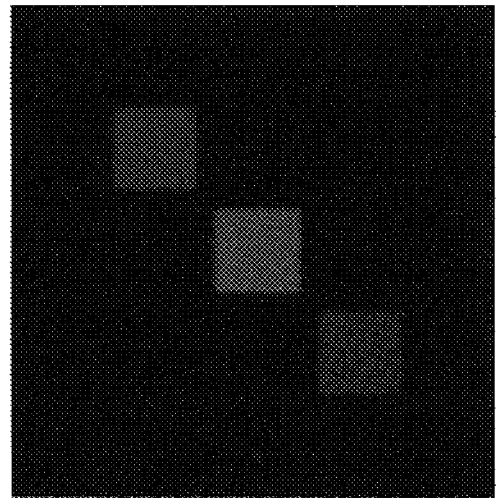
Figure 16:
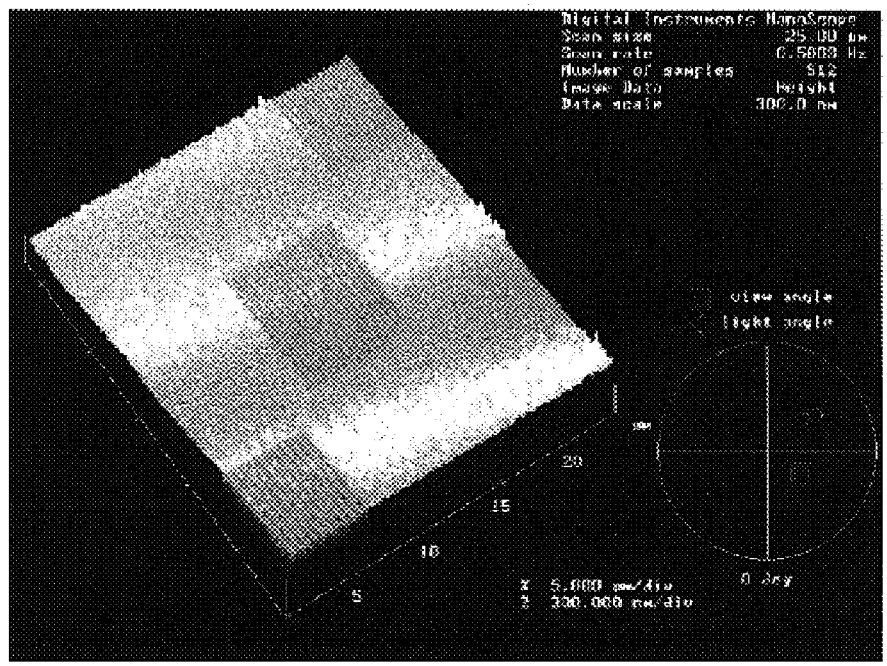

FIG. 16*a* shows the observed color from three diffractive swatches, each 10 microns on a side, illuminated with white light at an angle of 60 degrees away from perpendicular to the structure surface, and observed from a direction perpendicular to the surface. For the red swatch, the period is 0.7 microns; green has 0.6 micron period, and the blue has 0.5 micron spacing. FIG. 16b shows the AFM surface profile of the same structure.

Comparison to State-of-the-Art Analog Image Storage

State-of-the-art analog image archival storage is currently done with photographic film. State-of-the-art resolution is defined by the effective grain size within the film, which defines the minimum "pixel" size for purposes of resolution comparison. For black and white images, the grain size is approximately 3 microns in diameter, giving a pixel area of 10 square microns. For color analog archival storage, this color grain size is on the order of 10 microns, for an effective pixel size of 100 square microns.

Using Example Method I outlined above, black and white pixel sizes of 0.4 microns can be achieved (for visible light,) yielding pixel areas of 0.16 square microns, or 60 times smaller than the state-of-the-art. Using currently available UV light sources, this effective pixel size can be reduced to 0.04 square microns, or an effective higher storage density of 250 times. For color storage, effective pixel sizes of 0.7 microns diameter can be achieved, for a pixel area of 0.5 square microns.

Using Example Method II outlined above, black and white pixel sizes of 1.4 microns can be achieved (for visible light,) yielding pixel areas of 2.0 square microns. Using currently available UV light sources, this effective pixel size can be reduced to 0.5 square microns. For color storage, effective pixel sizes of 2.5 microns diameter can be achieved, for a pixel area of 6 square microns.

This resolution information is summarized in the following table:

is then translated through the FIB controlling electronics into an image stored within the storage medium. As an example of this process, the following method using existing microcomputer technology could be employed:

The image to be stored is electronically scanned using some method such as a digital camera. The image thus created is now stored in digital form, such as a standard "bitmap" file, electronically within the computer. This transient image is then translated, pixel by pixel, through a lookup table, into appropriate FIB current, dwell time, and position characteristics. The image is then written into the medium, using one of the examples described above (i.e. interference color pixellation or reflective diffractive color pixellation.) It should be noted that it is entirely possible to perform this translation of "image-to-be-stored" into stored image using solely analog means.

Readback of the stored image is achieved simply by exposing the storage medium to visible light (perpendicular to the surface in the case of interference color, at some appropriate fixed angles in the case of reflective diffractive color,) and observing the medium surface with the appropriate optical viewing system, such as a microscope.

Embodiment for Holography

Figure 17:
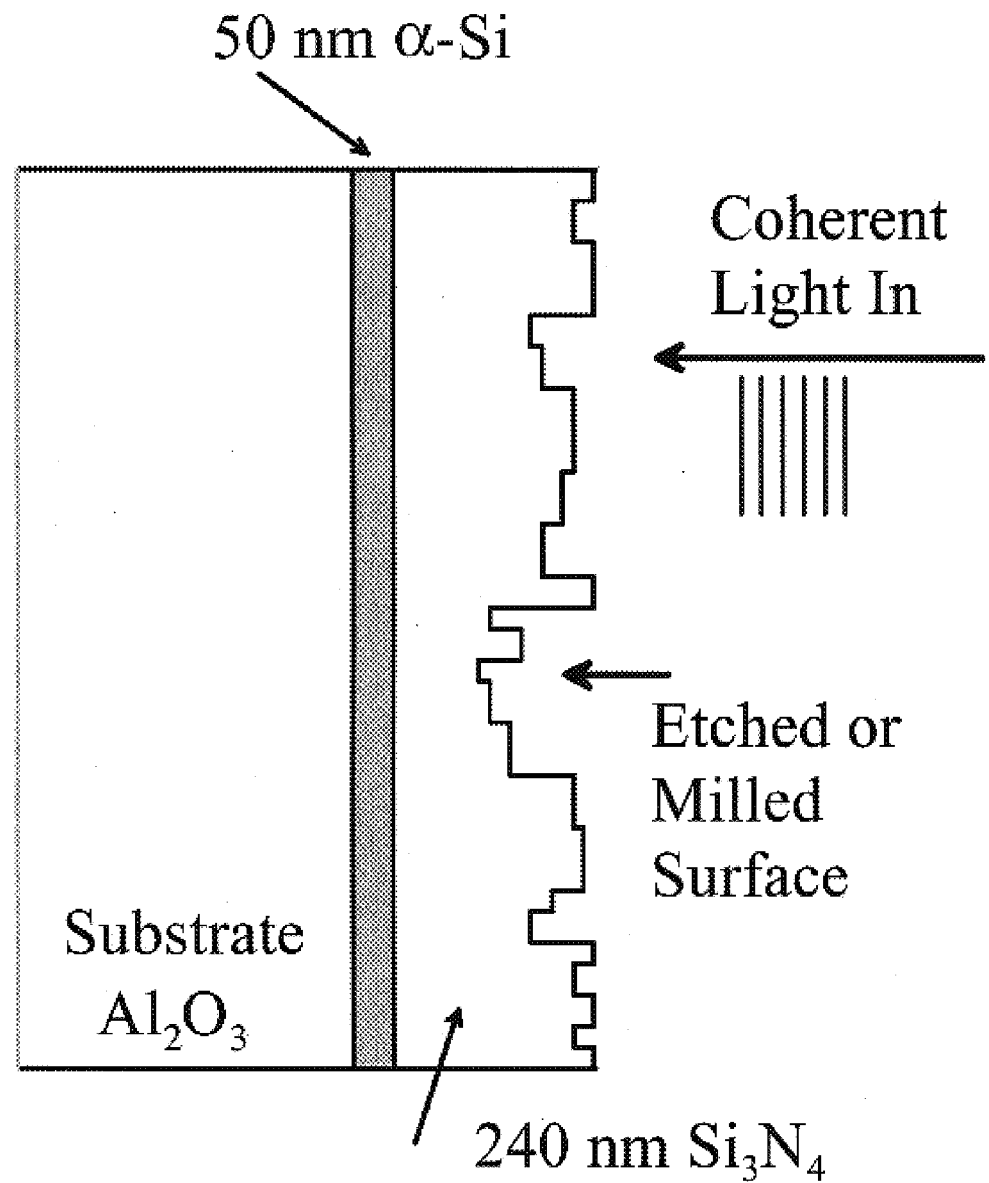
FIG. 17) Diagram for read back of written hologram.

Based upon the predictive capabilities for milled or etched optical thin film structures, it is possible to create structures with known amplitude and phase reflectivity characteristics as a function of position. The specific structure described above and shown in FIG. 11 can be used: a substrate of sapphire, $Al_2O_3$, has been coated with an optical thin film of 50 nanometer thickness α-Silicon, and then 240 nanometers of silicon nitride, $Si_3N_4$. It is possible to calculate for this structure, with a computer, the phase and amplitude structure required to create a stored hologram, and translate this information into depth as a function of position across the structure. The resulting stored hologram can then be read back with a coherent light source (laser,) either in transmission or reflection mode. The read back of such a hologram is diagrammed in FIG. 17.

| Storage Method | B&W film | Color Film | B&W Interference | B&W UV Interference | Color Interference | B&W Diffraction | B&W UV Diffraction | Color Diffraction |
|---|---|---|---|---|---|---|---|---|
| Pixel Size (μm²) | 10 | 100 | 0.16 | 0.04 | 0.5 | 2.0 | 0.5 | 6 |
| Improve Factor | 1 | 1 | 60 | 250 | 200 | 5 | 20 | 15 |

As indicated above, both the milling and the ion-implantation modes of FIB operation can be scaled to create diffractive structures for light of wavelengths other than visible while still providing the wavelength separation necessary to maintain faithful records of the original image or other source data. In this way, as new light sources and detection abilities are developed, the art of analog color storage (or, more generally, analog light wavelength-dependent storage) by either of the two methods can be extended to even higher data density capabilities than those described above.

Description of Translation of an Analog Image to a Stored Image

For either of the embodiments described above for color analog storage, translation of an image "to be stored," into a stored image, is achieved in much the same way. The image must be scanned, providing a record of color as a function of position within the image, and this information

DIGITAL STORAGE

EXAMPLE METHOD I

Variable Reflectivity from Interference

Using an optical thin film (ranging in thickness between 1/1000 and 100 times the wavelength of light to be used,) coated on a polished, base substrate or optical thin film structure, it is possible to change the optical depth selectively of the surface layer by implantation and milling with the FIB. Because optical thin film structures act as interference filters, the local changes to the surface layer (including the change in thickness) serve to change the wavelength tuning of the interference filter structure, resulting in color change on reflection or transmission of white light incident on the region. When observed with a single color of light, an effective optical grey scale is defined. When this grey scale is broken up into discrete values, a digital storage is achieved.

One embodiment of a digital color storage system based upon the interference wavelength filtration properties of optical thin film structures is as follows (see FIG. 9): Defining the direction perpendicular to the surface of the storage medium as the "Z" direction, and also as the observation direction, it is possible selectively to modify the properties of the surface optical thin film so that the color properties of light reflected perpendicular to the surface are changed in a controllable and predictable way within small regions. Using a single color grey scale, 128 distinct levels of storage are easily attainable, with increases in this number dependent on quality of electronics available for read back, and the mechanical qualities of the system used for storage and retrieval. Furthermore, appropriate choice of optical thin film structures allows for variation of grey scale at two different wavelengths independently. In this way it is possible to store, readily, upwards of 1024 independent levels of information at a single spatial position on the medium surface. This represents an effective storage density increase in $\log_{base\ 2}$ (1024), or 10, compared to standard surface methods of digital information storage. The smallest region that can be effective is restricted by the wavelength of light used for read back of the analog image. Using conventionally available light sources, pixel sizes of 0.2 microns can be used, and this size can be decreased as available light sources decrease in wavelength.

A specific embodiment of the structure for this digital storage method is that illustrated in FIG. 11: a substrate of sapphire, $Al_2O_3$, has been coated with an optical thin film of 50 nanometer thickness α-Silicon, and then 240 nanometers of silicon nitride, $Si_3N_4$. For each wavelength within the visible, and including the near IR and UV light bands, the reflectivity or transmissivity can be varied through approximately 40% of the value of the light incident upon the structure at normal incidence, i.e. when the light source and the observation point are both perpendicular to the surface of the structure.

EXAMPLE METHOD II

Variable Reflective or Transmissive Diffraction at Multiple Angles

Using one of the six methods for changing the reflectivity and transmission of a material or structure as described above, it is possible to create surfaces with diffractive structures. Any time there exist features in reflectivity or transmission (either amplitude or phase) with spatial extent on the order of the size of the wavelength of the illuminating light, diffraction becomes important. Using the FIB, it is possible to create surface patterns with features smaller than the wavelength of visible light. The simplest such structure is a periodic spatial variation, of which FIG. 7) shows three examples. By changing the reflective and transmission properties of a material surface in a predictable and controllable way, it is possible to calculate the diffractive behaviour of the surface, even when the surface features are significantly more complex than simple periodic structures.

Figure 10:
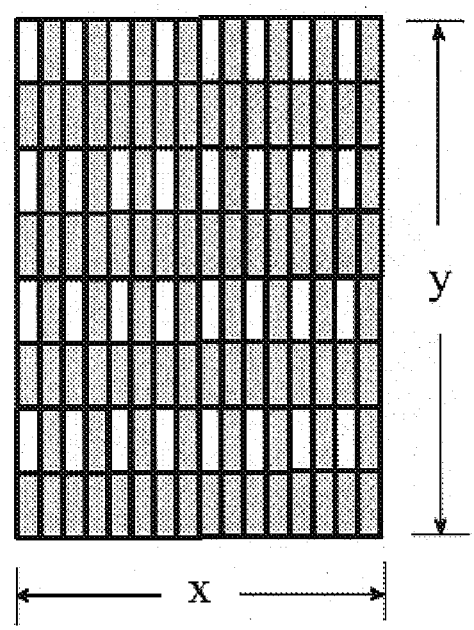
FIG. 10a) Example of a surface with diffractive pattern "pixel" for simultaneous diffraction in the X-Z plane and Y-Z plane.
FIG. 10b) Pixel viewed in X-Z plane.
FIG. 10c) Pixel viewed in Y-Z plane.
Figure 10:
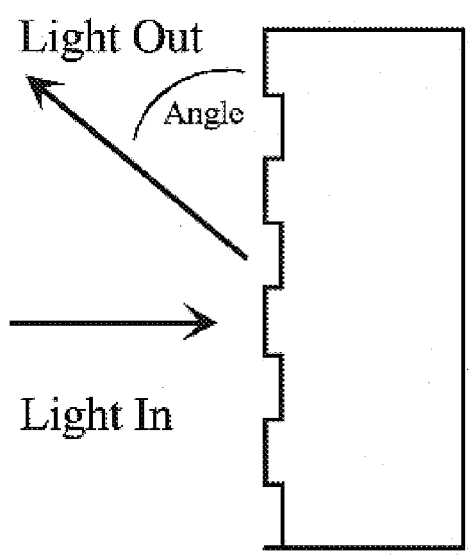
Figure 10:
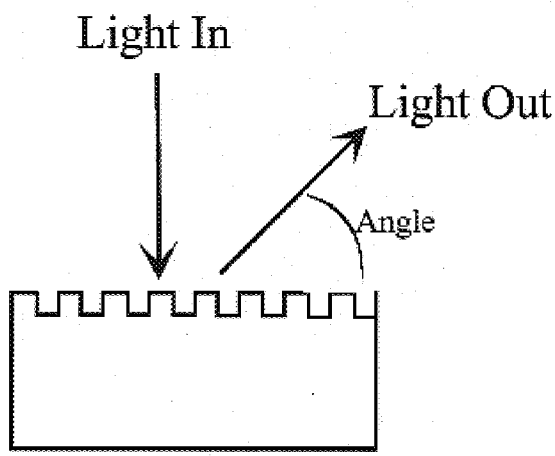

One embodiment of a digital color storage system based on the diffractive properties of a controlled medium or structure is as follows (see FIG. 10): Defining the direction perpendicular to the surface of the storage medium as the "Z" direction, and also as the illumination direction, it is possible to create periodic changes (using one of the six methods outlined above) along the X-direction with one period, and periodic changes along the Y-direction with a different period. This "checkerboard" structure can now be observed from a fixed set of angles in the X-Z plane (e.g. 40 degrees from perpendicular in either direction) to diffract one spectrum of light due to the periodic structure along the X-direction, and from a fixed set of angles in the Y-Z plane (e.g. 40 degrees from perpendicular in either direction) to diffract another spectrum of light due to the periodic structure along the Y-direction. In this way, a full range of colors, including black and white, can be created in a small region. At a single wavelength of light, it is possible to use this diffractive structure method to create a grey scale at the observation point, for illumination in a single plane (i.e. X-Z plane, or Y-Z plane). 512 distinct levels of storage are easily attainable, with increases in this number dependent on quality of electronics available for read back, and the mechanical qualities of the system used for storage and retrieval. Using the other plane simultaneously at the same wavelength, $2^{10}$ distinct levels can easily be obtained for digital information storage. Furthermore, use of more complex (i.e. not simply periodic) diffractive structures allows for simultaneous use of this digital grey scale method at other wavelengths, extending the potential number of digital combinations even further, potentially beyond $2^{15}$ distinct levels within each pixel. Because the effective pixel size is approximately 3.5 times on a side longer than that used for current optical data storage, the number cited above ($2^{10}$) represents a gain of 10 times the area storage density of current means of digital storage, with potential to increase this beyond 25 times the area storage density.

Comparison to State of the Art Digital Storage

Current optical storage technology uses "on-off" information bits, or binary information at each storage position. Readback is achieved using single color light illumination. As described above, the two methods used as examples of digital information storage can be compared to conventional optical storage by comparing the number of levels of information stored at each spatial location. The size of the spatial storage location is determined by the wavelength of light used; therefore, the availability of new light sources at different wavelengths would enable any of these digital storage methods (including the conventional methods) also to scale in size.

In the case of Variable Reflectivity from Interference, 512, or $2^9$ levels of information can easily be stored at one location, representing an increase in area storage density of 9 times or greater. This number can be increased by using additional colors of light. In the case of Variable Reflective Diffraction at Multiple Angles, or $2^{10}$ levels of information can easily be stored at one location; because the storage location is now nearly four times greater, this represents an increase in area storage density of 10 times or greater. This number can also be increased by using additional colors of light simultaneously.

Another issue of great importance to the archiving of data, both analog and digital, is that of longevity and durability of the medium. The methods described above can be applied to a wide range of media, and specifically, to media which are extremely durable. With the use of highly refractory compounds, media which cannot be altered by sunlight, exposure to electric or magnetic fields, or temperatures encountered in typical structure fires can be created, with lifetimes that extend into the thousands of years. In comparison, photographic film has a lifetime on the order of a decade, magnetic tape and disk media have average lifetimes on the order of a year, and CD and DVD storage media have average lifetimes on the order of decades.

Predictive Capabilities

For both Analog (or continuous) data storage, and Digital (or discrete) data storage, the properties of the implanted/milled/etched structures can be predicted, based on the tabulated optical properties of the materials used to form the base structures for data storage, and the knowledge of how these properties combine in forming the final data storage structure. The predictive capabilities are identical for either analog or digital storage; the only difference is in the method of reading back the data which is applied to the material structure.

Media Used

Media which can be potentially useful for data storage using the methods described herein include every material into which ions can be implanted. By definition, this includes all solid materials. Choice of materials which are of most use is based on specific material properties, and can be modeled using computer programs based on the properties of optical thin films.

Specific examples of materials that have been used include: diamond-like carbon (DLC), DLC coated on sapphire, silicon, chromium, nickel, gold, vitreous carbon, yttria on silicon, alumina on silicon, glass (silica), lithium fluoride, and magnesium fluoride on glass. Gallium ions with 25 keV energy were used for implantation for convenience. Any other ion over a range of energies (low keV to MeV range) can also be used*. The following effects have been observed:

1) Changes in optical properties due to material amorphization.

2) Changes in optical properties due to material expansion.

3) Changes in optical properties due to material contraction.

4) Changes in optical properties due to formation of color centers within the material.

5) Changes in optical properties due to formation of micro-clusters within the material.

6) Changes in optical properties due to material ordering (crystallization.)

7) Changes in optical properties due to material doping. These changes occur within the implantation depth of the ions into the medium.

An example of color from interference pixels created by milling of and implantation into optical thin films of silicon nitride and alumina coated onto silicon are shown in FIG. 11.

* See, e.g. Townsend, P. D. et.al., Optical Effects of Ion Implantation, Cambridge Univ. Press, Cambridge, 1994. Stopping Range of Ions in Matter, (SRIM) computer code developed by IBM, cf. J. F. Ziegler.

What is claimed is:

1. A method for recording and reading back literal analog color or black-and-white images comprising the steps of:
  (a) Preparing or obtaining a medium of known optical properties which has a flat, highly polished surface, and has coated upon this surface one or more optical thin films (ranging in thickness between 1/1000 and 100 times the wavelength of light to be used) made from materials of known optical properties, of controlled and known thickness, with adjacent layers made from different materials;
  (b) Milling, with the focused ion beam, under medium ($10^{-7}$–$10^{-8}$ torr) to high ($10^{-9}$–$10^{-11}$ torr) vacuum, or implanting ions into, under medium ($10^{-7}$–$10^{-8}$ torr) to high ($10^{-9}$–$10^{-11}$ torr) vacuum and then performing a subsequent wet etch to, the outermost layer or layers to specified, controlled depths from the original surface at different positions in the plane of the medium surface, corresponding to the appropriate colors, tints and hues of the original image;
  (c) Illuminating the medium thus prepared with an optical magnifying system that focuses white light, or light of three specific colors in narrow wavelength bands (e.g. Red, Green, and Blue,) for color images, or light from a single, narrow wavelength band (ranging from Xray wavelengths to the IR,) perpendicular to the milled surface, and has a point of observation to monitor the light reflected from, or transmitted through, and in a direction perpendicular to, the prepared surface.

2. A method for recording literal analog color or black-and-white images comprising the steps of:
  (a) Preparing or obtaining a medium of known optical properties which has a flat, highly polished surface, and has coated upon this surface one or more optical thin films (ranging in thickness between 1/1000 and 100 times the wavelength of light to be used) made from materials of known optical properties, of controlled and known thickness, with adjacent layers made from different materials;
  (b) Milling, with the focused ion beam, under medium ($10^{-7}$–$10^{-8}$ torr) to high ($10^{-9}$–$10^{-11}$ torr) vacuum, or implanting ions into, under medium ($10^{-7}$–$10^{-8}$ torr) to high ($10^{-9}$–$10^{-11}$ torr) vacuum and then performing a subsequent wet etch to, the outermost layer or layers to specified, controlled depths from the original surface at different positions in the plane of the medium surface, patterns along the x-direction and the y-direction in the surface of the prepared medium which are periodic within an area defined as a single color element that makes up the entire image, corresponding to the appropriate color and intensity values of the original image when illuminated with white light at the appropriate angles;
  (c) Illuminating the medium thus prepared with white light, or light of three specific colors in narrow wavelength bands (e.g. Red, Green, and Blue,) for color images, or light from a single, narrow wavelength band (ranging from Xray wavelengths to the IR,) at fixed angles above (reflective diffraction) or below (transmissive diffraction) the plane of the medium, in the two planes defined by 1) the x-direction in the prepared surface and the direction perpendicular to the plane of the prepared surface and 2) the y-direction in the prepared surface and the direction perpendicular to the plane of the prepared surface, for observation of the light diffracted from the milled surface towards a point in a direction perpendicular to the prepared surface.

3. A method for recording literal analog color or black-and-white images comprising the steps of:
  (a) Preparing or obtaining a medium of known optical properties which has a flat, highly polished surface, and has coated upon this surface one or more optical thin films (ranging in thickness between 1/1000 and 100 times the wavelength of light to be used) made from materials of known optical properties, of controlled and known thickness, with adjacent layers made from different materials;
  (b) Milling, with the focused ion beam, under medium ($10^{-7}$–$10^{-8}$ torr) to high ($10^{-9}$–$10^{-11}$ torr) vacuum, or implanting ions into, under medium ($10^{-7}$–$10^{-8}$ torr) to high ($10^{-9}$–$10^{-11}$ torr) vacuum and then performing a subsequent wet etch to, in multiple different images (probably adjacent to each other,) the outermost layer or layers to specified, controlled depths from the original surface at different positions in the plane of the medium surface, corresponding to a grey scale representation of three- or four-color separation (e.g. CMYK, RGB) of the original image;

(c) Illuminating the medium thus prepared with an optical magnifying system that focuses white light, or light of some specific narrow wavelength band (including UV or Xray wavelengths,) perpendicular to the milled surface, and has a point of observation to monitor the light reflected from, or transmitted through, and in a direction perpendicular to, the prepared surface.

(d) Knitting the images thus obtained in read back into a single image with full color, either with an appropriate optical system, or by computer.

4. A method for recording literal analog color or black-and-white images comprising the steps of:

(a) Preparing or obtaining a medium of known optical properties which has a flat, highly polished surface, and has coated upon this surface one or more optical thin films (ranging in thickness between 1/1000 and 100 times the wavelength of light to be used) made from materials of known optical properties, of controlled and known thickness, with adjacent layers made from different materials;

(b) Milling, with the focused ion beam, under medium ($10^{-7}$–$10^{-8}$ torr) to high ($10^{-9}$–$10^{-11}$ torr) vacuum, or implanting ions into, under medium ($10^{-7}$–$10^{-8}$ torr) to high ($10^{-9}$–$10^{-11}$ torr) vacuum and then performing a subsequent wet etch to, the outermost layer or layers to specified, controlled depths from the original surface at different positions in the plane of the medium surface, patterns along the x-direction and the y-direction in the surface of the prepared medium which are periodic within an area defined as a single color element that makes up the entire image, corresponding to a grey scale representation of three- or four-color separation (e.g. CMYK, RGB) of the original image;

(c) Illuminating the medium thus prepared with white light, or light from a single, narrow wavelength band (ranging from Xray wavelengths to the IR,) at fixed angles above (reflective diffraction) or below (transmissive diffraction) the plane of the medium, in the two planes defined by 1) the x-direction in the prepared surface and the direction perpendicular to the plane of the prepared surface and 2) the y-direction in the prepared surface and the direction perpendicular to the plane of the prepared surface, for observation of the light diffracted from the milled surface towards a point in a direction perpendicular to the prepared surface.

(d) Knitting the images thus obtained in read back into a single image with full color, either with an appropriate optical system, or by computer.

5. A method for recording digital information comprising the steps of:

(a) Preparing or obtaining a medium of known optical properties which has a flat, highly polished surface, and has coated upon this surface one or more optical thin films (ranging in thickness between 1/1000 and 100 times the wavelength of light to be used) made from materials of known optical properties, of controlled and known thickness, with adjacent layers made from different materials;

(b) Milling, with the focused ion beam, under medium ($10^{-7}$–$10^{-8}$ torr) to high ($10^{-9}$–$10^{-11}$ torr) vacuum, or implanting ions into, under medium ($10^{-7}$–$10^{-8}$ torr) to high ($10^{-9}$–$10^{-11}$ torr) vacuum and then performing a subsequent wet etch to, the outermost layer or layers to specified, controlled depths from the original surface at different positions or pixels in the plane of the medium surface, corresponding to the appropriate reflectivity at a chosen wavelength for that position or pixel;

(c) Illuminating the medium thus prepared with an optical magnifying system that focuses light of the chosen wavelength, in a direction perpendicular to the surface, onto a single position or pixel at a time, one after another, in a pre-arranged order, and translating the resulting light signal reflected from, or transmitted through, perpendicular to the surface, into a number that corresponds to the position, thus creating a series of numbers representing data.

6. A method for recording digital information comprising the steps of:

(a) Preparing or obtaining a medium of known optical properties which has a flat, highly polished surface, and has coated upon this surface one or more optical thin films (ranging in thickness between 1/1000 and 100 times the wavelength of light to be used) made from materials of known optical properties, of controlled and known thickness, with adjacent layers made from different materials;

(b) Milling, with the focused ion beam, under medium ($10^{-7}$–$10^{-8}$ torr) to high ($10^{-9}$–$10^{-11}$ torr) vacuum, or implanting ions into, under medium ($10^{-7}$–$10^{-8}$ torr) to high ($10^{-9}$–$10^{-11}$ torr) vacuum and then performing a subsequent wet etch to, the outermost layer or layers to specified, controlled depths from the original surface at different positions in the plane of the medium surface, patterns along the x-direction and the y-direction in the surface of the prepared medium which are periodic within an area defined as a single pixel that makes up the storage area, corresponding to the appropriate signal level of the original data when illuminated with light of the chosen color at the appropriate angles;

(c) Illuminating the medium thus prepared with light of the chosen color at fixed angles above (reflective diffraction) or below (transmissive diffraction) the plane of the medium, in the two planes defined by 1) the x-direction in the prepared surface and the direction perpendicular to the plane of the prepared surface and 2) the y-direction in the prepared surface and the direction perpendicular to the plane of the prepared surface, for observation of the light diffracted from the milled surface towards a point in a direction perpendicular to the prepared surface, one pixel area at a time, one after the other in a specified order, and translation of the light intensity thus observed into a series of numbers that represent data.

7. A method for embedding analog images within analog images comprising the steps of:

(a) Preparing or obtaining a medium of known optical properties which has a flat, highly polished surface, and has coated upon this surface one or more optical thin films (ranging in thickness between 1/1000 and 100 times the wavelength of light to be used) made from materials of known optical properties, of controlled and known thickness, with adjacent layers made from different materials;

(b) Milling, with the focused ion beam, under medium ($10^{-7}$–$10^{-8}$ torr) to high ($10^{-9}$–$10^{-11}$ torr) vacuum, or implanting ions into, under medium ($10^{-7}$–$10^{-8}$ torr) to high ($10^{-9}$–$10^{-11}$ torr) vacuum and then performing a subsequent wet etch to, the outermost layer or layers to specified, controlled depths from the original surface at different positions in the plane of the medium surface, corresponding to the appropriate grey scale values of the original image(s) when illuminated by the appropriate chosen wavelengths of light;

(c) Illuminating the medium thus prepared with an optical magnifying system that focuses light of one of the chosen wavelengths (ranging from Xray wavelengths to the IR,) perpendicular to the milled surface, and has a point of observation to monitor the light reflected from, or transmitted through, and in a direction perpendicular to, the prepared surface, and distinguishes the stored images by selection of the observation wavelength band of light.

8. A method for embedding analog images within analog images comprising the steps of:

(a) Preparing or obtaining a medium of known optical properties which has a flat, highly polished surface, and has coated upon this surface one or more optical thin films (ranging in thickness between 1 nanometer and several microns) made from materials of known optical properties, of controlled and known thickness, with adjacent layers made from different materials;

(b) Milling, with the focused ion beam, under medium ($10^{-7}$–$10^{-8}$ torr) to high ($10^{-9}$–$10^{-11}$ torr) vacuum, or implanting ions into, under medium ($10^{-7}$–$10^{-8}$ torr) to high ($10^{-9}$–$10^{-11}$ torr) vacuum and then performing a subsequent wet etch to, the outermost layer or layers to specified, controlled depths from the original surface at different positions in the plane of the medium surface, patterns along the x-direction in the surface of the prepared medium which are periodic within an area defined as a single pixel that makes up the entire image, corresponding to the appropriate grey scale values of the original image when illuminated with the chosen color of light from a single, narrow wavelength band (ranging from Xray wavelengths to the IR,) at the appropriate angles, with a similar pattern created with pixels (not necessarily the same pixels as in the x-direction) in the y-direction, for illumination with a chosen narrow wavelength band of light (not necessarily the same as for in the x-direction;)

(c) Illuminating the medium thus prepared alternately with the chosen light for the x-direction, at fixed angles above (reflective diffraction) or below (transmissive diffraction) the plane of the medium, in the plane defined by the x-direction in the prepared surface and the direction perpendicular to the plane of the prepared surface for the first image, and with the chosen light for the y-direction, at fixed angles above (reflective diffraction) or below (transmissive diffraction) the plane of the medium, in the plane defined by the y-direction in the prepared surface and the direction perpendicular to the plane of the prepared surface for the second image.

9. A method for recording monochromatic phase and amplitude holograms comprising the steps of:

(a) Preparing or obtaining a medium of known optical properties which has a flat, highly polished surface, and has coated upon this surface one or more optical thin films (ranging in thickness between 1/1000 and 100 times the wavelength of light to be used) made from materials of known optical properties, of controlled and known thickness, with adjacent layers made from different materials;

(b) Milling, with the focused ion beam, under medium ($10^{-7}$–$10^{-8}$ torr) to high ($10^{-9}$–$10^{-11}$ torr) vacuum, or implanting ions into, under medium ($10^{-7}$–$10^{-8}$ torr) to high ($10^{-9}$–$10^{-11}$ torr) vacuum and then performing a subsequent wet etch to, the outermost layer or layers to specified, controlled depths from the original surface at different positions in the plane of the medium surface, corresponding to the appropriate phase and amplitude reflectivity, or transmissivity, for a hologram; (c) Illuminating the medium thus prepared with white light or coherent light of a particular narrow wavelength band from the point corresponding to the appropriate illumination point use in creating the hologram.

* * * * *